United States Patent [19]
Fullerton et al.

[11] Patent Number: 6,133,876
[45] Date of Patent: Oct. 17, 2000

[54] SYSTEM AND METHOD FOR POSITION DETERMINATION BY IMPULSE RADIO

[75] Inventors: Larry W. Fullerton, Huntsville, Ala.;
James L. Richards, Fayetteville, Tenn.;
Ivan A. Cowie, Madison, Ala.

[73] Assignee: Time Domain Corporation, Huntsville, Ala.

[21] Appl. No.: 09/045,929

[22] Filed: Mar. 23, 1998

[51] Int. Cl.[7] .................................................. H01Q 3/22
[52] U.S. Cl. ........................... 342/375; 342/132; 342/457; 342/463
[58] Field of Search ................................ 342/262, 134, 342/450, 463, 457, 132, 375

[56] References Cited

U.S. PATENT DOCUMENTS

| | | | |
|---|---|---|---|
| 2,716,236 | 8/1955 | Reinish et al. | 343/13 |
| 3,068,473 | 12/1962 | Muth | 343/112 |
| 3,213,449 | 10/1965 | Kobayashi et al. | 343/12 |
| 3,376,504 | 4/1968 | Chick | 324/68 |
| 3,396,393 | 8/1968 | Wagner | 343/14 |
| 3,461,452 | 8/1969 | Welter | 343/12 |
| 3,659,292 | 4/1972 | Low et al. | 343/6.5 R |
| 3,714,650 | 1/1973 | Fuller et al. | 343/6.5 LC |
| 3,829,674 | 8/1974 | Joseph | 235/181 |
| 4,315,260 | 2/1982 | Küpfer | 343/7.5 |
| 4,743,906 | 5/1988 | Fullerton | 342/27 |
| 4,916,429 | 4/1990 | Hicks et al. | 340/436 |
| 4,916,455 | 4/1990 | Bent et al. | 342/457 |
| 5,216,429 | 6/1993 | Nakagawa et al. | 342/450 |
| 5,510,800 | 4/1996 | McEwan | 342/387 |
| 5,589,838 | 12/1996 | McEwan | 342/387 |
| 5,661,490 | 8/1997 | McEwan | 342/387 |
| 5,748,891 | 5/1998 | Fleming et al. | 375/200 |
| 5,809,424 | 9/1998 | Eizenhoefer | 455/456 |
| 5,859,612 | 1/1999 | Gilhousen | 342/457 |
| 5,912,644 | 6/1999 | Wang | 342/457 |

*Primary Examiner*—Thomas H. Tarcza
*Assistant Examiner*—Dao L. Phan
*Attorney, Agent, or Firm*—Sterne, Kessler, Goldstein & Fox P.L.L.C.

[57] ABSTRACT

A system and a method for position determination by impulse radio using a first transceiver having a first clock providing a first reference signal and a second transceiver placed spaced from the first transceiver. The system determines the position of the second transceiver. The second transceiver has a second clock that provides a second reference signal. A first sequence of pulses are transmitted from the first transceiver. The first sequence of pulses are then received at the second transceiver and the second transceiver is then synchronized with the first sequence of pulses. A second sequence of pulses are transmitted from the second transceiver. The first transceiver receives the second sequence of pulses and the first transceiver is synchronized with the second sequence of pulses. A delayed first reference signal is generated in response to the synchronization with the second sequence of pulses. A time difference between the delayed first reference signal and the first reference signal is then measured. The time difference indicates a total time of flight of the first and second sequence of pulses. The distance between the first and the second transceiver is determined from the time difference. The direction of the second transceiver from the first transceiver is determined using a directional antenna. Finally, the position of the second transceiver is determined using the distance and the direction.

25 Claims, 16 Drawing Sheets

ACTUAL TIME OF FLIGHT=$(t_4-t_1)-(t_3-t_2)$

SYSTEM AND METHOD FOR POSITION DETERMINATION BY IMPULSE RADIO

BACKGROUND OF THE INVENTION

1. Field of the Invention

This invention generally relates to position determination, and more specifically to a system and method for position determination by impulse radio.

2. Related Art

In recent years, modern communications technology has provided various systems for position determination. The global positioning system (GPS) operated by the United States Department of Defense, for example, is a highly complex system of determining the position of an object. The GPS system depends on measuring the time-of-flight of microwave signals from three or more orbiting satellite transmitters by a navigation receiver that computes the position of the mobile unit. According to the GPS system, each satellite broadcasts a time-stamped signal that includes the satellite's ephemeris, i.e., its own position. When the mobile unit receives a GPS signal, the mobile unit measures the transmission delay relative to its own clock and determines the pseudo-range to the transmitting satellite's position. The GPS system requires three satellites for two-dimensional positioning, and a fourth satellite for three-dimensional positioning.

Another approach is that employed by the U.S. Navy's TRANSIT system. In that system, a mobile unit performs continuous doppler measurements of a signal broadcast by a low earth orbit (LEO) satellite. The measurements continue for several minutes. The system usually requires two passes of the satellite, necessitating a wait of more than 100 minutes. In addition, because the position calculations are performed by the mobile unit, the satellite must broadcast information regarding its position, i.e., its ephemeris. Although the TRANSIT system is capable of high accuracy (on the order of one meter), the delay required is unacceptable for commercial applications.

Although these systems accurately determine the unknown position of an object, they are extremely complex, and, more importantly, expensive to implement. For example, both the GPS and TRANSIT systems require multiple satellites, sophisticated receivers and antennas that require hundreds of millions dollars of investments. Also, response times of GPS and TRANSIT systems are typically slow due to their narrow bandwidth. Furthermore, since these systems depend on orbiting satellites, they require an unimpeded view of the sky to operate effectively.

There is a great need in many different fields for a simple, less expensive alternative to complicated position determination systems. One such area is a typical shipping terminal, e.g., a major sea-port or an airport. In a sea-port, containers having valuable cargo are stored at warehouses or are left in designated places in the terminals. Also, containers are sometimes moved from one section of the port to another section in preparation for their eventual loading into a cargo ship or being picked up by trucks or railcars after being unloaded from a cargo ship. Often it is necessary to determine the location of one or more containers. However, it is difficult to identify one or more containers among hundreds, or thousands of containers in a terminal. Similar problems are also encountered in airports and railway terminals where containers are kept in storage sites.

A simple, less expensive position determination system is also desirable for locating police units. Such a position determination system can be used as a vehicle locator system. A city dispatcher would be able to quickly and efficiently dispatch police units if the dispatcher has pre-existing knowledge of each unit's locations. Currently city dispatchers use mobile phones to communicate with police units in order to know their locations. However, using mobile phones to determine the positions of the police units has some disadvantages. Use of mobile phones is expensive and time consuming. Also, when a police officer is not in the car, it is not possible to determine the unit's location.

Recently, the FCC has mandated that all cell phone systems implement position determination for use in emergency call location. In addition, there is a need for position determination as part of cell phone security, fraudulent use, and zone handoff algorithms. These requirements are difficult to meet and GPS is not adequate to reliably deliver the required accuracy.

For these reasons, it is clear that there is a need for a simple, low cost position determination system.

SUMMARY OF THE INVENTION

The present invention is directed to a system and a method for position determination using impulse radios. According to one embodiment of the present invention, a first transceiver having a first clock providing a first reference signal is positioned. A second transceiver whose position is to be determined is spatially displaced from the first transceiver. The second transceiver has a second clock that provides a second reference signal.

To determine the position of the second transceiver, a first sequence of pulses are transmitted from the first transceiver. The first sequence of pulses are then received at the second transceiver and the second transceiver is then synchronized with the first sequence of pulses. Then, a second sequence of pulses are transmitted from the second transceiver. The first transceiver receives the second sequence of pulses and the first transceiver is synchronized with the second sequence of pulses. A delayed first reference signal is generated in response to the synchronization with the second sequence of pulses. Then, a time difference between the delayed first reference signal and the first reference signal is measured. The time difference indicates a total time of flight of the first and second sequence of pulses.

Then, the distance between the first and the second transceiver is determined from the time difference. Then, the direction of the second transceiver from the first transceiver is determined using a directional antenna. Finally, the position of the second transceiver is determined using the distance and the direction.

In another embodiment of the present invention a plurality of first transceivers and a second transceiver are placed such that each transceiver is spaced from the others. The distance between each first transceiver and the second transceiver is measured. Then, the position of the second transceiver is determined using a triangulation method.

In yet another embodiment of the present invention, the second transceiver is placed in a mobile telephone whose position is to be determined. This allows a user of a mobile telephone to determine his or her exact location.

The position determination system according to the present invention provides numerous advantages over conventional position determination systems described before. For example, the present invention does not require the use of expensive orbiting satellites. Thus, the present invention is less expensive to implement. Also, signals from orbiting satellites are often impeded by obstacles, such as trees or overhead structures. Since, the present invention does not require the use of orbiting satellites, the operation of the present invention is not impeded by obstacles, such as trees or other structures. Furthermore, since the present invention utilizes ultra-wideband signals, it provides a relatively fast response time. As a result, the position of an object can be determined much faster than it would be possible using existing systems.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Overview of the Invention

Figure 1B:
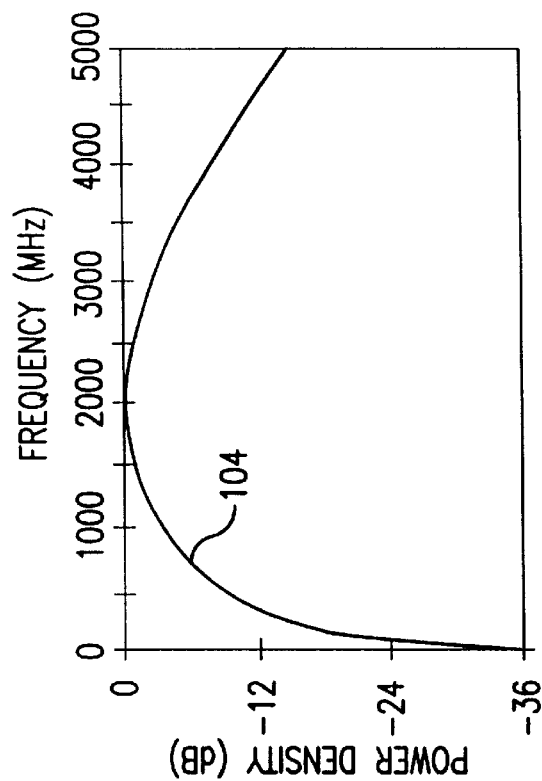
FIGS. 1A and 1B show a 2 GHz center frequency monocycle pulse in the time and frequency domains, respectively, in accordance with the present invention.

The present invention is directed to a system and a method for position determination using impulse radios. Impulse radio was first fully described in a series of patents, including U.S. Pat. Nos. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14, 1997), U.S. Pat. No. 5,687,169 (issued Nov. 11, 1997) and co-pending Application No. 08/761,602 (filed Dec. 6, 1996) to Fullerton et al. These patent documents are incorporated herein by reference.

Prior to a detailed description of the present invention, a high level explanation of the invention is provided. According to one embodiment of the present invention, a first transceiver having a first clock providing a first reference signal is positioned. A second transceiver whose position is to be determined is placed spaced from the first transceiver. The second transceiver has a second clock that provides a second reference signal.

A first sequence of pulses are transmitted from the first transceiver. The first sequence of pulses are then received at the second transceiver and the second transceiver is then synchronized with the first sequence of pulses. Next, a second sequence of pulses are transmitted from the second transceiver. The first transceiver receives the second sequence of pulses and the first transceiver is synchronized with the second sequence of pulses. Next, a delayed first reference signal is generated in response to the synchronization with the second sequence of pulses. Next, a time difference between the delayed first reference signal and the first reference signal is measured. The time difference indicates a total time of flight of the first and second sequence of pulses.

Next, the distance between the first and the second transceiver is determined from the time difference. Then, the direction of the second transceiver from the first transceiver is determined using a direction finding antenna. Finally, the position of the second transceiver is determined using the distance and the direction.

In another embodiment of the present invention, the second transceiver is placed in a mobile telephone whose position is to be determined. This allows a mobile telephone network to determine a user's exact location. Additional embodiments are described in detail below in the section titled "Position Determination by Impulse Radio."

Impulse Radio Basics

Impulse radio refers to a radio system based on a waveform that is essentially the impulse response of the available bandwidth. An ideal impulse radio waveform is a short Gaussian monocycle. As the name suggests, this waveform attempts to approach one cycle of RF energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval is varied on a pulse-by-pulse basis by two components: an information component and a pseudo-random code component. Generally, spread spectrum systems make use of pseudo-random codes to spread the normally narrow band information signal over a relatively wide band of frequencies. A spread spectrum receiver correlates these signals to retrieve the original information signal. Unlike direct sequence spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, jamming resistance and reducing the signature of a signal to an intercept receiver.

The impulse radio receiver is typically a homodyne receiver with a cross correlator front end in which the front end coherently converts an electromagnetic pulse train of monocycle pulses to a baseband signal in a single stage. The baseband signal is the basic information channel for the basic impulse radio communications system, and is also referred to as the information bandwidth. It is often found desirable to include a subcarrier with the base signal to help reduce the effects of amplifier drift and low frequency noise. The subcarrier that is typically implemented alternately reverses modulation according to a known pattern at a rate faster than the data rate. This pattern is reversed again just before detection to restore the original data pattern. This method permits AC coupling of stages, or equivalent signal processing to eliminate DC drift and errors from the detection process. This method is described in detail in U.S. Pat. No. 5,677,927 to Fullerton et al.

The data rate of the impulse radio transmission is only a fraction of the periodic timing signal used as a time base. Each data bit typically time position modulates many pulses of the periodic timing signal. This yields a modulated, coded timing signal that comprises a train of identically shaped pulses for each single data bit. The cross correlator of the impulse radio receiver integrates multiple pulses to recover the transmitted information.

Waveform

Impulse radio refers to a radio system based on a waveform that approaches the impulse response of the available bandwidth. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

In the course of system analysis and design, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

where

σ is a time scaling parameter, t is time, $f_{mono}(t)$ is the waveform voltage, and e is the natural logarithm base.

Figure 1A:
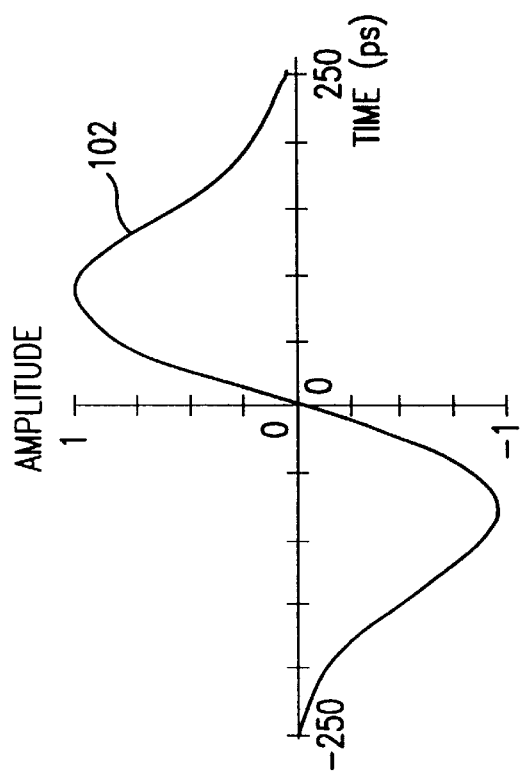

The frequency domain spectrum of the above waveform is shown in FIG. 1B. The corresponding equation is:

$$F_{mono}(f) = (2\pi)^{\frac{3}{2}}\sigma f e^{-2(\pi\sigma f)^2}$$

The center frequency ($f_c$) or frequency of peak spectral density is:

$$f_c = \frac{1}{2\pi\sigma}$$

These pulses, or burst of cycles, may be produced by methods described in the patents referenced above or by other methods that are known to one of ordinary skill in the art. Any practical implementation will deviate from the ideal mathematical model by some amount, which may be considerable since impulse radio systems can tolerate seemingly considerable deviation with acceptable system consequences. This is especially true in the microwave implementations where precise waveform shaping is difficult to achieve.

These mathematical models are provided as an aid to describing the ideal operation and are not intended to limit the invention. In fact, any burst of cycles that adequately fills a given bandwidth and has an adequate on-off attenuation ratio for a given application will serve the purpose of this invention.

One of the great advantages of measuring distances and locating positions using this waveform is that the pulse is short enough for individual cycles to be identified so that ambiguity is removed and distance can be resolved to better than a cycle given adequate signal to noise ratio. This can be done by locking onto the signal at incremental cycle points and noting which one has the greatest amplitude. This lock point will be the main lock point and can be used to calibrate the system.

A Pulse Train

Although one or more bit per pulse systems have been conceived, impulse radio systems typically use pulse trains, not single pulses, for communications. As described in detail below, the impulse radio transmitter produces and outputs a train of pulses for each bit of information.

Figure 2B:
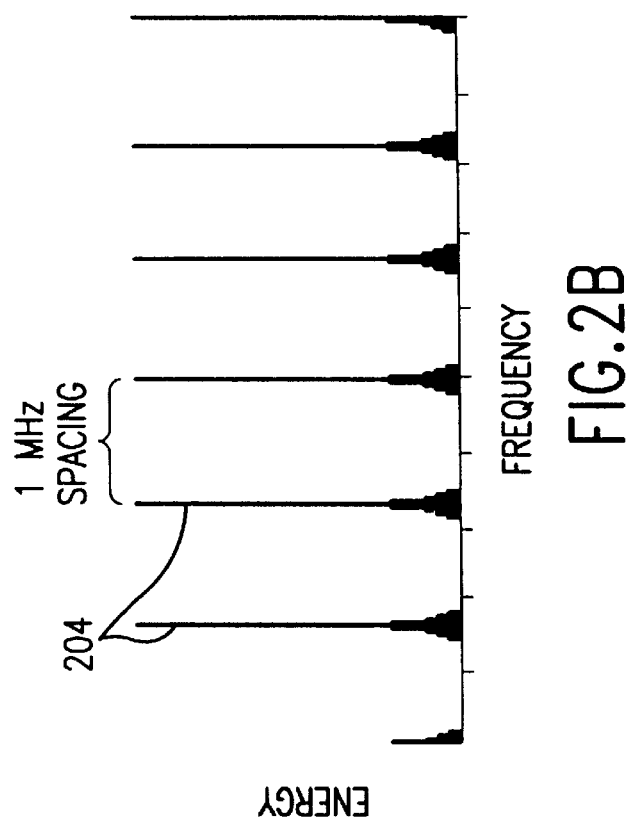
FIGS. 2A and 2B are illustrations of a 1 mpps system with 1 ns pulses in the time and frequency domains, respectively, in accordance with the present invention.
Figure 2A:
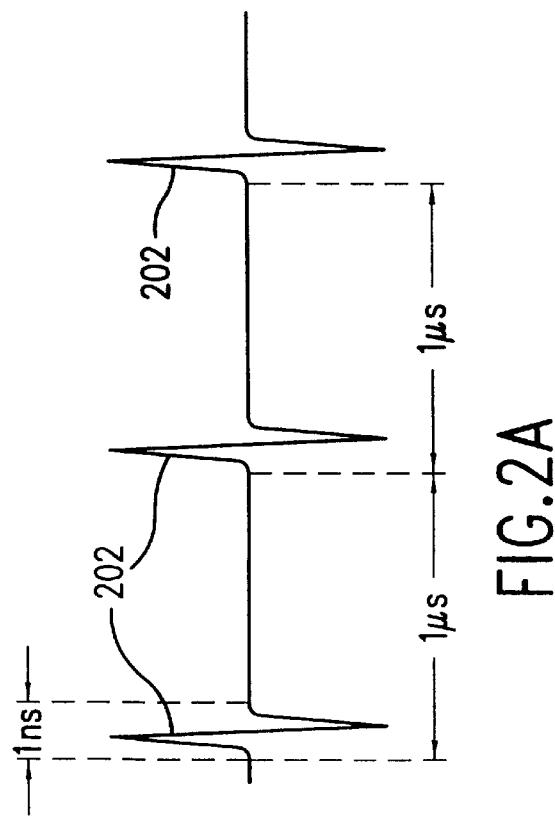
Figure 3:
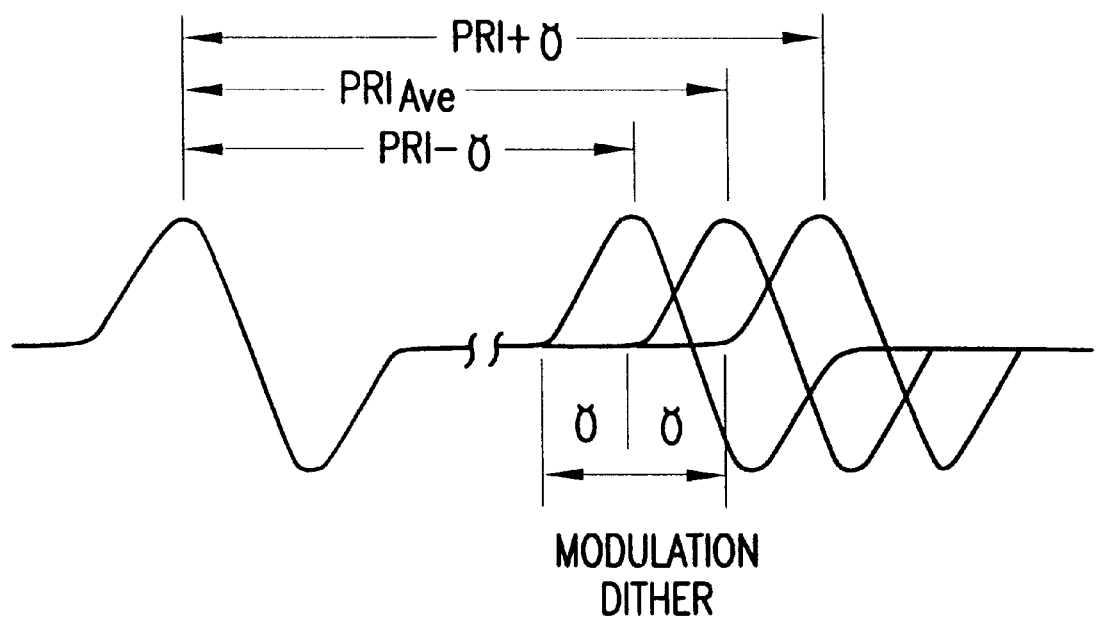
FIG. 3 illustrates a modulating signal that changes the pulse repetition interval (PRI) in proportion to the modulation in accordance with the present invention.

Prototypes built by the inventors have pulse repetition frequencies of between 0.7 and 10 megapulse per second (mpps, where each megapulse is $10_6$ pulses). FIGS. 2A and 2B are illustrations of a 1 mpps system with (uncoded, unmodulated) 1 nanosecond (ns) pulses in the time and frequency domains (see 102 and 104, respectively). In the frequency domain, this highly regular pulse train produces energy spikes (comb lines 204) at one megahertz intervals; thus, the already low power is spread among the comb lines 204. This pulse train carries no information and, because of the regularity of the energy spikes, might interfere with conventional radio systems at short ranges.

Impulse radio systems typically have very low duty cycles so the average power in time domain is significantly lower than its peak power in the time domain. In the example in FIGS. 2A and 2B, the impulse transmitter operates 0.1% of the time (i.e., 1 ns per microsecond ($\mu s$)).

Additional processing is needed to modulate the pulse train so that the impulse radio system can actually communicate information. The additional processing also smooths the energy distribution in the frequency domain so that impulse radio transmissions (e.g., signals) interfere minimally with conventional radio systems.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount δ. With this method, the modulation shift is very small relative to the code shift. In a 10 mpps system with a center frequency of 2 GHz, for example, the coded pulse position may be anywhere within 100 ns, but any given pulse would be specified to be at its assigned position within 30 picoseconds (ps). The modulation would deviate this position by 75 ps, early or late, to represent a 1 or a 0 at that level of coding. Note that this is typically not the final data level of coding, but a pseudo Manchester subcarrier level of coding.

Thus, a train of n pulses is each delayed a different amount from its respective time base clock position by a code delay amount plus a modulation amount, where n is the number of pulses associated with a given data symbol digital bit.

Coding for Energy Smoothing and Channelization

Because the receiver is a cross correlator, the amount of time position modulation required for one-hundred percent modulation is calculated by $1/(4f_c)$ (where $f_c$ is the center frequency). For a monocycle with a center frequency of 2.0 GHz, for example, this corresponds to ±125 (ps) of time position modulation. The spectrum-smoothing effects at this level of time dither is negligible.

Figure 4:
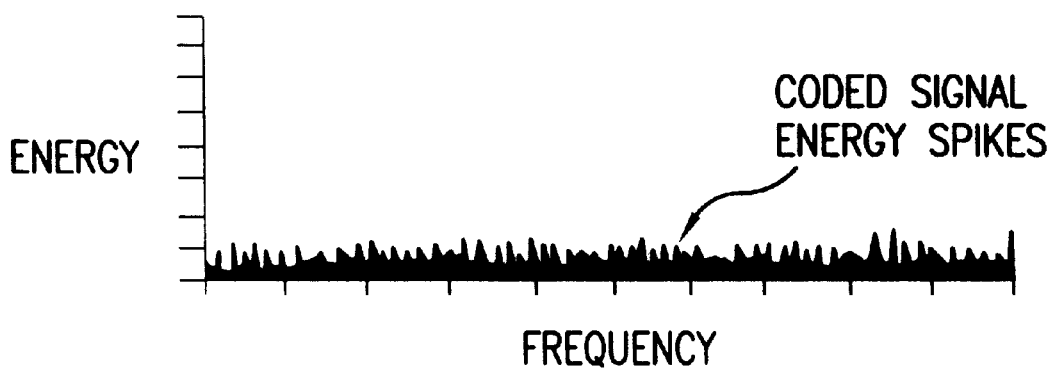
FIG. 4 is a plot illustrating the impact of pseudo-random dither on energy distribution in the frequency domain in accordance with the present invention.

Impulse radio achieves optimal smoothing by applying to each pulse a pseudo-random noise (PN) code dither with a much larger magnitude than the modulation dither. FIG. 4 is a plot illustrating the impact of PN code dither on energy distribution in the frequency domain. FIG. 4, when compared to FIG. 2B, shows the impact of using a 256 position PN code relative to an uncoded signal.

PN code dithering also provides for multi-user channelization (channelization is a technique employed to divide a communications path into a number of channels). In an uncoded system, differentiating between separate transmitters would be very hard. The PN codes create channels, if the PN codes themselves are relatively orthogonal (i.e., there is low correlation and/or interference between the codes being used).

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Fortunately, implementations of an impulse radio according to the present invention do not depend on receiving every pulse. The impulse radio receiver performs a correlating, synchronous receiving function (at the RF level) that uses a statistical sampling of many pulses to recover the transmitted information.

Impulse radio receivers typically integrate 100 or more pulses to yield the demodulated output. The optimal number of pulses over which the receiver integrates is dependent on a number of variables, including pulse rate, bit rate, jamming levels, and range.

Jam Resistance

Besides channelization and energy smoothing, the PN coding also makes impulse radio highly resistant to jamming from all radio communications systems, including other impulse radio transmitters. This is critical as any other signals within the band occupied by an impulse signal act as a jammer to the impulse radio. Since there are no unallocated bands available for impulse systems, they must share spectrum with other conventional radios without being adversely affected. The PN code helps impulse systems discriminate between the intended impulse transmission and interfering transmissions from others.

Figure 5:
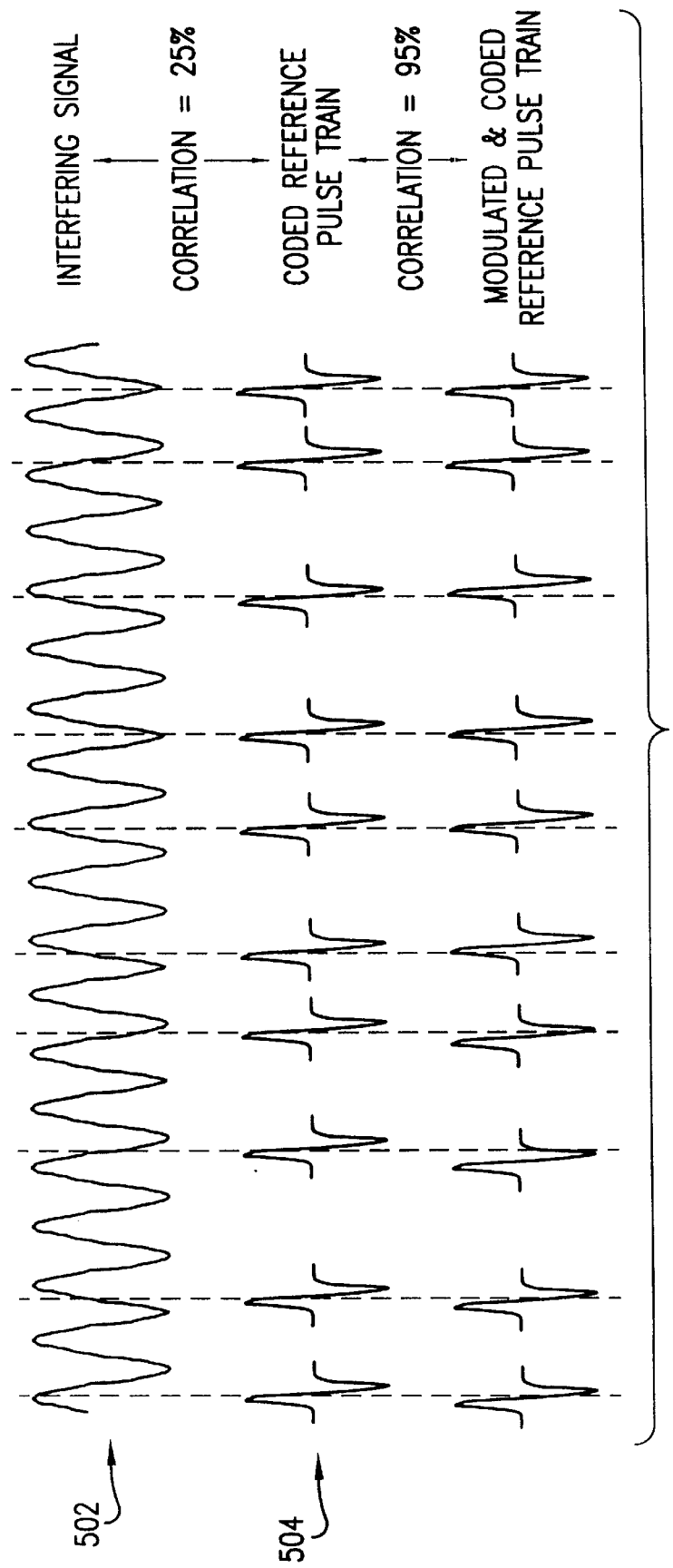
FIG. 5 illustrates the result of a narrowband sinusoidal (interference) signal overlaying an impulse radio signal in accordance with the present invention.

FIG. 5 illustrates the result of a narrowband sinusoidal jamming (interference) signal 502 overlaying an impulse radio signal 504. At the impulse radio receiver, the input to the cross correlator would include that narrowband signal 502, as well as the received ultrawide-band impulse radio signal 504. Without PN coding, the cross correlator would sample the jamming signal 502 with such regularity that the jamming signals could cause significant interference to the impulse radio receiver. However, when the transmitted impulse signal is encoded with the PN code dither (and the impulse radio receiver is synchronized with that identical PN code dither) it samples the jamming signals randomly. According to the present invention, integrating over many pulses negates the impact of jamming. In statistical terms, the pseudo-randomization in time of the receive process creates a stream of randomly distributed values with a mean of zero (for jamming signals).

Processing Gain

Impulse radio is jam resistant because of its large processing gain. For typical spread spectrum systems, the definition of processing gain, which quantifies the decrease in channel interference when wide-band communications are used, is the ratio of the bandwidth of the channel to the bandwidth of the information signal. For example, a direct sequence spread spectrum system with a 10 kHz information bandwidth and a 16 MHz channel bandwidth yields a processing gain of 1600 or 32 dB. However, far greater processing gains are achieved with impulse radio systems where for the same 10 KHz information bandwidth and a 2 GHz channel bandwidth the processing gain is 200,000 or 53 dB.

The duty cycle (e.g., of 0.5%) yields a process gain of 23 dB. (The process gain is generally the ratio of the bandwidth of a received signal to the bandwidth of the received information signal.) The effective oversampling from integrating multiple pulses to recover the information (e.g., integrating 200 pulses) yields a process gain of 23 dB. Thus, a 2 GHz divided by a 10 mpps link transmitting 50 kilobits per second (kbps) would have a process gain of 46 dB, (i.e., 0.5 ns pulse width divided by a 100 ns pulse repetition interval would have a 0.5% duty cycle, and 10 mps divided by a 50,000 bps would have 200 pulses per bit.)

Capacity

Figures 6A, 6B:
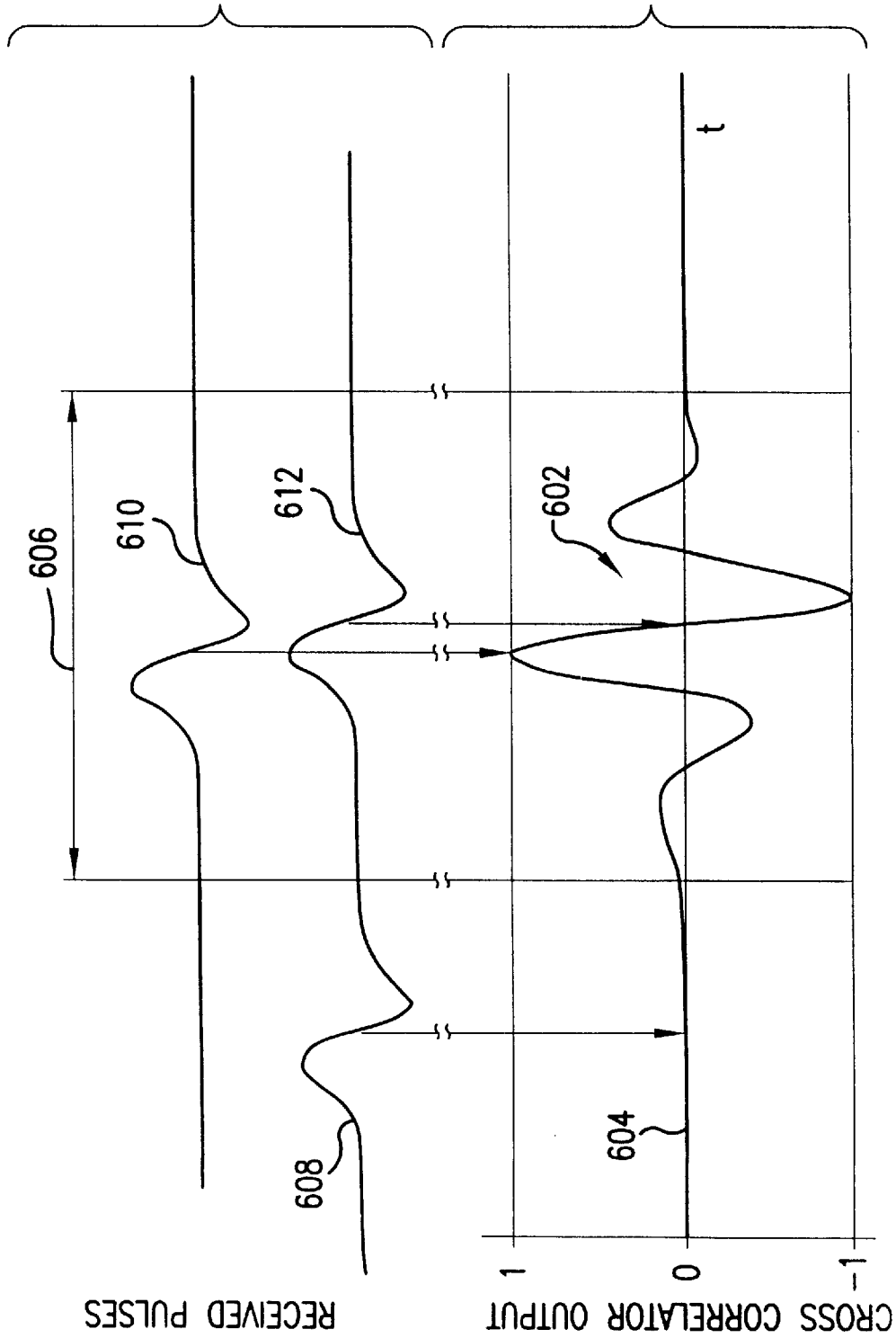
FIG. 6A and 6B show received pulses at a cross correlator and output signal at the cross correlator, respectively.

Theoretical analyses suggest that impulse radio systems can have thousands of voice channels. To understand the capacity of an impulse radio system one must carefully examine the performance of the cross correlator. FIG. 6B shows the "cross correlator transfer function" 602. This represents the output value of an impulse radio receiver cross correlator as a function of received pulse timing. As illustrated at 604, the cross correlator's output is zero volts when pulses arrive outside of a cross correlation window 606. As pulse arrival time varies along the time axis of FIG. 6A, the corresponding correlator output integral varies according to FIG. 6B. It is at its maximum (e.g., 1 volt) when the pulse is τ/4 ahead of the center of the window (as shown at 610), zero volts when centered in the window (as shown at 612); and at its minimum (e.g., −1 volt) when it is τ/4 after the center.

When the system is synchronized with the intended transmitter, the cross correlator's output has a swing of maximum value, e.g., between ±1 volt (as a function of the transmitter's modulation). Other in-band transmission would cause a variance to the cross correlator's output value. This variance is a random variable and can be modeled as a Gaussian white noise signal with a mean value of zero. As the number of interferers increases the variance increases linearly. By integrating over a large number of pulses, the receiver develops an estimate of the transmitted signal's modulation value. Thus, the:

$$\text{Variance of the Estimate} = \frac{N\sigma^2}{\sqrt{Z}} \quad (1)$$

Where

N=number of interferers, $\sigma^2$ is the variance of all the interferers to a single cross correlation, and Z is the number of pulses over which the receiver integrates to recover the modulation.

This is a good relationship for a communications system for as the number of simultaneous users increases, the link quality degrades gradually (rather than suddenly).

Multipath and Propagation

Multipath fading, the bane of sinusoidal systems, is much less of a problem (i.e., orders of magnitude less) for impulse systems than for conventional radio systems. In fact, Rayleigh fading, so noticeable in cellular communications, is a continuous wave phenomenon, not an impulse communications phenomenon.

In an impulse radio system in order for there to be multipath effects, special conditions must persist. The path length traveled by the scattered pulse must be less than the pulse's width times the speed of light, and/or successively emitted pulses at the transmitter (in the sequence) arrive at the receiver at the same time.

For the former with a one nanosecond pulse, that equals 0.3 meters or about 1 foot (i.e., 1 ns×300,000,000 meters/second). (See FIG. 7, in the case where the pulse traveling "Path 1" arrives one half a pulse width after the direct path pulse.)

For the latter with a 1 megapulse per second system that would be equal to traveling an extra 300, 600 or 900 meters. However, because each individual pulse is subject to the pseudo-random dither, these pulses are decorrelated.

Figure 7B:
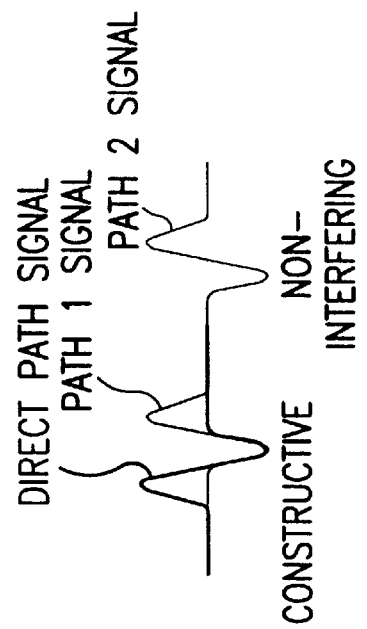
FIGS. 7A and 7B illustrate impulse radio multipath effects in accordance with the present invention.
Figure 7A:
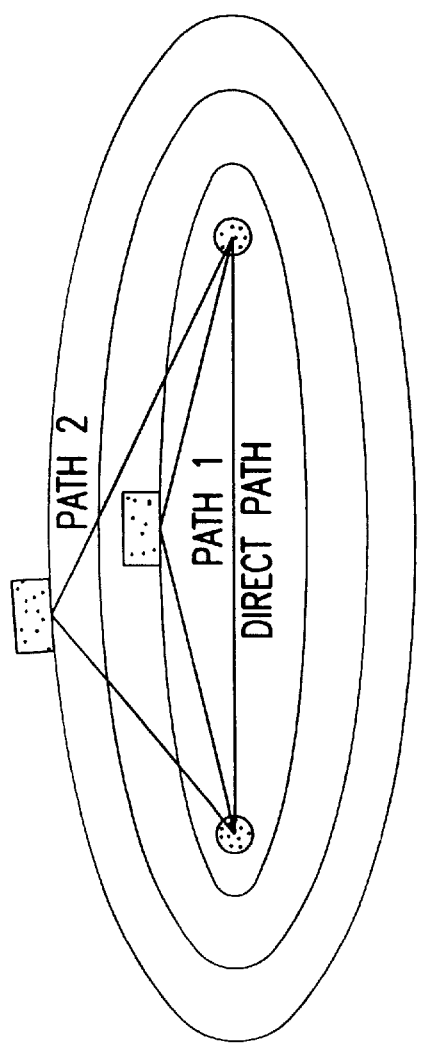

Pulses traveling between these intervals do not cause self-interference (in FIG. 7, this is illustrated by the pulse traveling Path 2). While pulses traveling grazing paths, as illustrated in FIG. 7 by the narrowest ellipsoid, create impulse radio multipath effects.

Figure 8:
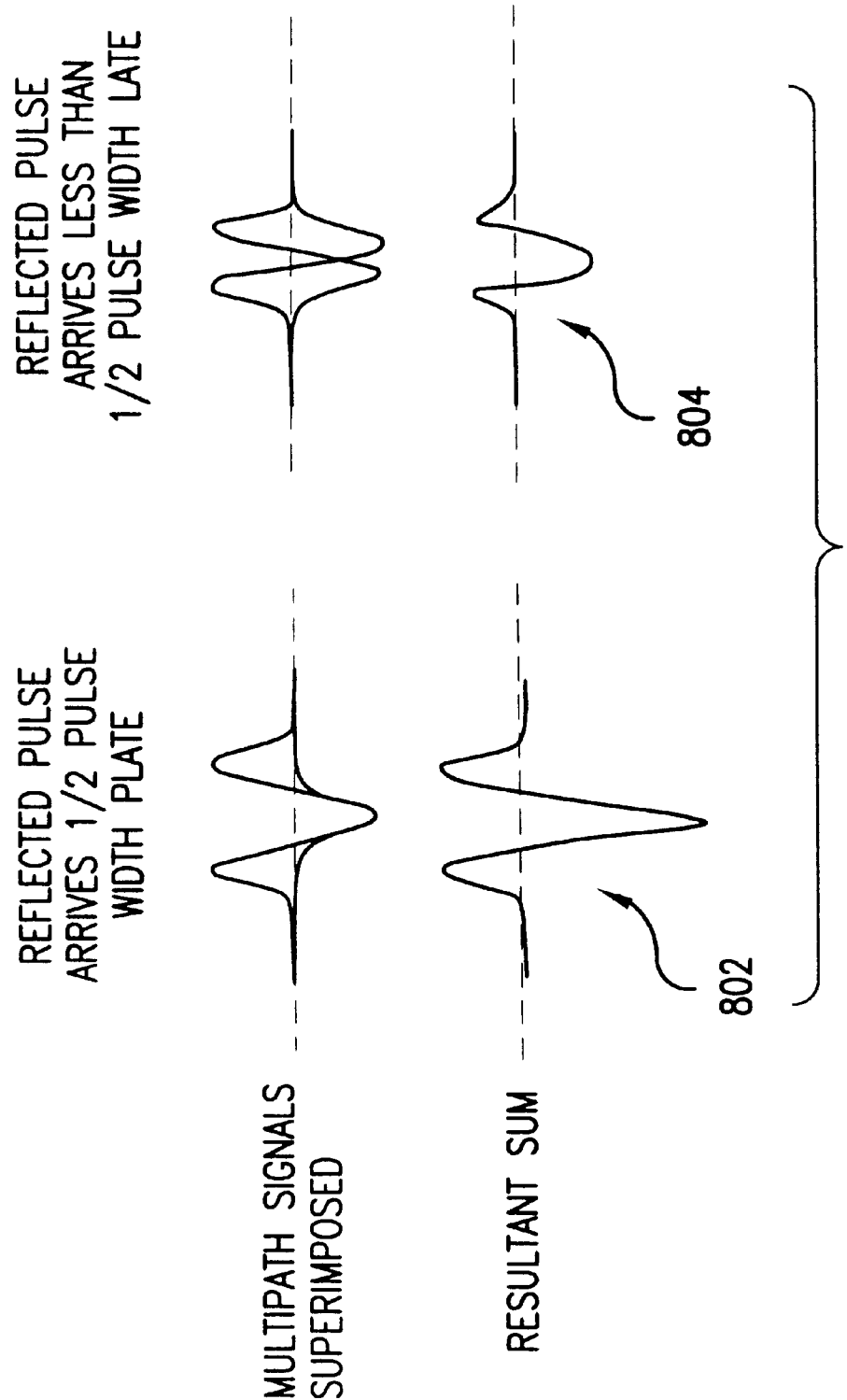
FIG. 8 illustrates the phase of the multipath pulse in accordance with the present invention.

As illustrated in FIG. 8 at 802, if the multipath pulse travels one half width of a pulse width further, it increases the power level of the received signal (the phase of the multipath pulse will be inverted by the reflecting surface). If the pulse travels less than one half a pulse width further it will create destructive interference, as shown at 804. For a 1 ns pulse, for example, destructive interference will occur if the multipath pulse travels between about 0 and 15 cm (0 and 6 inches).

Position Determination By Impulse Radio

Although, the advantages of the impulse radio technology have been demonstrated in voice and data communication, an additional area that can benefit from the impulse radio technology is position determination. The impulse radio technology can be advantageously utilized to determine the position of an object, and it can provide a less expensive, simpler alternative to the GPS and the TRANSIT systems discussed earlier.

The present invention is a system and a method for position determination by impulse radio technology. The preferred embodiments of the invention are discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

Figure 9:
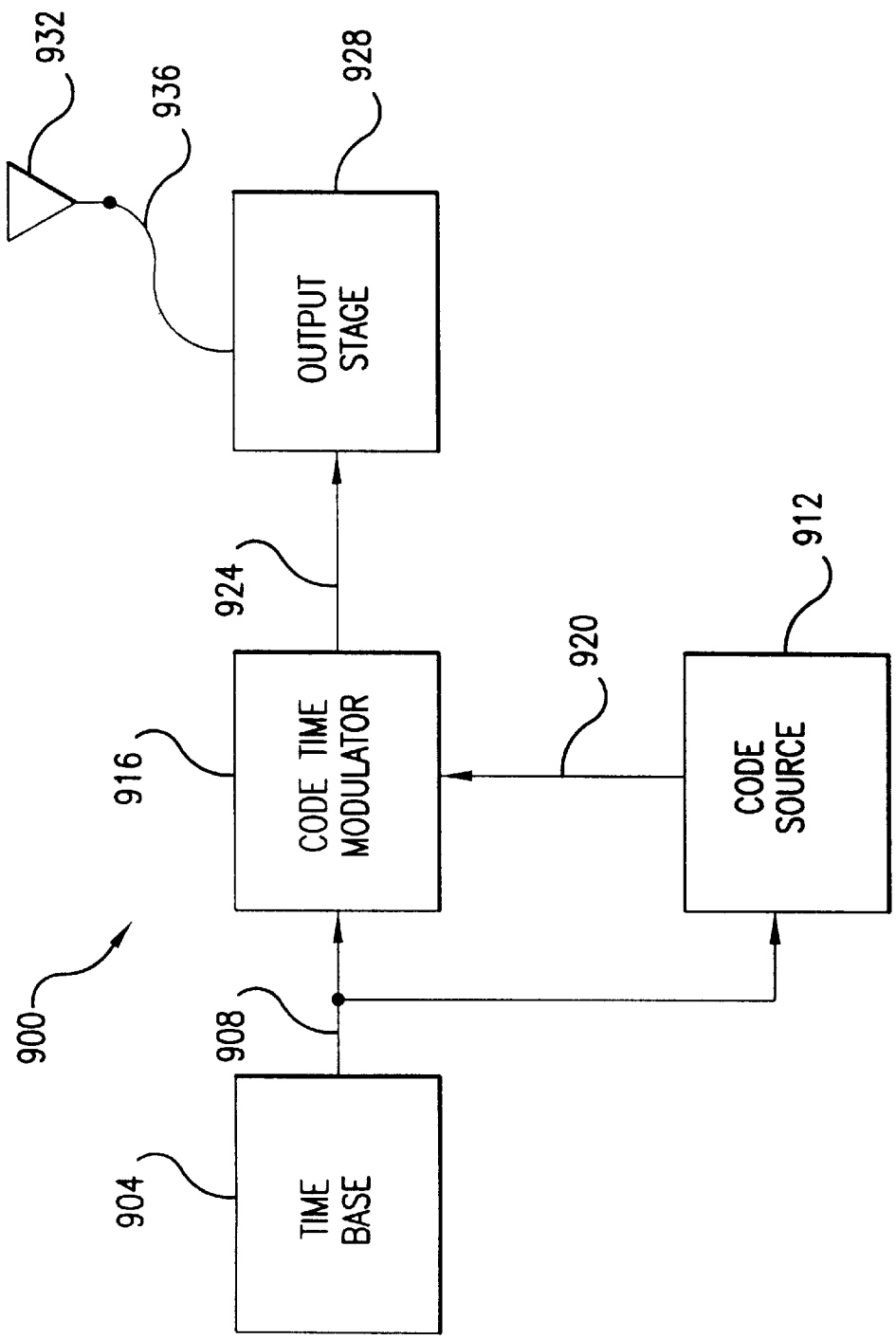
FIG. 9 illustrates one embodiment of an impulse radio transmitter according the present invention.

FIG. 9 illustrates an embodiment of an impulse radio transmitter 900 according to the present invention that can be used in position determination. Referring now to FIG. 9, transmitter comprises a time base 904 that generates a periodic timing signal 908. The time base 904 comprises a voltage controlled oscillator, or the like, which is typically locked to a crystal reference, having a high timing accuracy. The periodic timing signal 908 is supplied to a code source 912 and a code time modulator 916.

The code source 912 comprises a shift register, a computational device or a storage device such as a random access memory (RAM), read only memory (ROM), or the like, for storing codes and outputting the codes as code signal 920. In one embodiment of the present invention, orthogonal PN codes are stored in the code source 912. The code source 912 monitors the periodic timing signal 908 to permit the code signal to be synchronized to the code time modulator 916. The code time modulator 916 uses the code signal 920 to modulate the periodic timing signal 908 for channelization and smoothing of the final emitted signal. The output of the code time modulator 916 is called a coded timing signal 924.

The coded timing signal 924 is provided to an output stage 928 that uses the coded timing signal as a trigger to generate pulses. The pulses are sent to a transmit antenna 932 via a transmission line 936 coupled thereto. The pulses are converted into propagating electromagnetic waves by the transmit antenna 932. The electromagnetic waves propagate to an impulse radio receiver (shown in FIG. 10) through a propagation medium, such as air.

Figure 10:
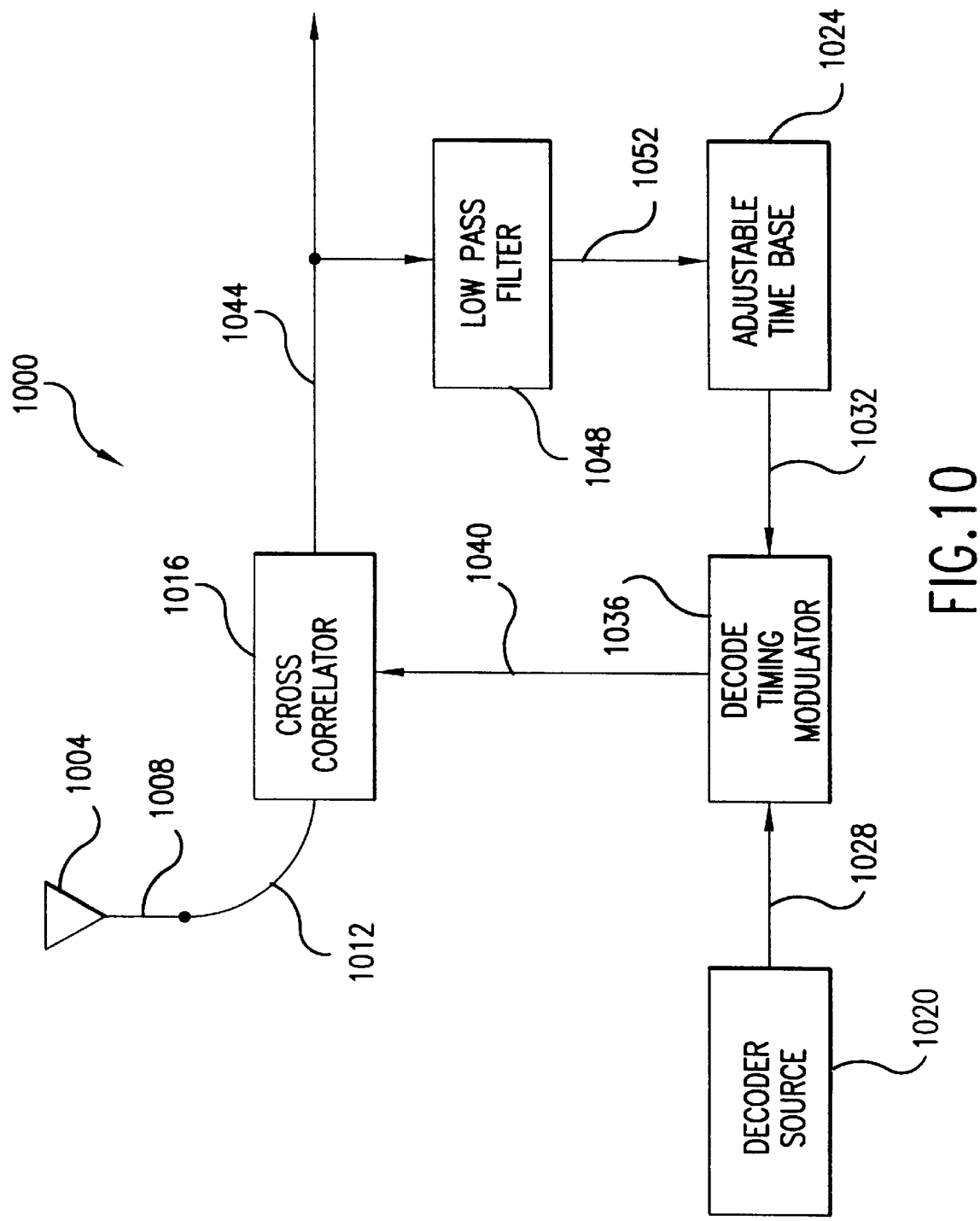
FIG. 10 illustrates one embodiment of an impulse radio receiver according to the present invention.

FIG. 10 illustrates an impulse radio receiver 1000 according to one embodiment of the present invention that can be used in position determination. Referring now to FIG. 10, the impulse radio receiver 1000 comprises a receive antenna 1004 for receiving a propagating electromagnetic wave and converting it to an electrical signal, referred herein as the received signal 1008. The received signal is provided to a cross correlator 1016 via a transmission line 1012 coupled to the receive antenna 1004.

The receiver 1000 comprises a decode source 1020 and an adjustable time base 1024. The decode source 1020 generates a decode signal 1028 corresponding to the code used by the associated transmitter 900 that transmitted the propagated signal. The adjustable time base 1024 generates a periodic timing signal 1032 that comprises a train of template signal pulses having waveforms substantially equivalent to each pulse of the received signal 1008.

The decode signal 1028 and the periodic timing signal 1032 are received by the decode timing modulator 1036. The decode timing modulator 1036 uses the decode signal 1028 to position in time the periodic timing signal 1032 to generate a decode control signal 1040. The decode-control signal 1040 is thus matched in time to the known code of the transmitter 900 so that the received signal 1008 can be detected in the cross correlator 1016.

The output 1044 of the cross correlator 1016 results from the cross multiplication of the input pulse 1008 and the signal 1040 and the integration of the resulting signal. This is the correlation process. The signal 1044 is filtered by a low pass filter 1048 and a signal 1052 is generated at the output of the low pass filter 1048. The signal 1052 is used to control the adjustable time base 1024 to lock onto the received signal. The signal 1052 corresponds to the average value of the cross correlator output, and is the lock loop error signal that is used to control the adjustable time base 1024 to maintain a stable lock on the signal. If the received pulse train is slightly early, the output of the low pass filter 1048 will be slightly high and generate a time base correction to shift the adjustable time base slightly earlier to match the incoming pulse train. In this way, the receiver is held in stable relationship with the incoming pulse train. Further impulse radio receiver and transmitter embodiments are described in the U.S. Pat. Nos. 5,677,927 and 5,687,169 patents noted above.

FIGS. 11–16 illustrate system level diagrams of several embodiments of the present invention using one or more impulse radios.

Figure 11:
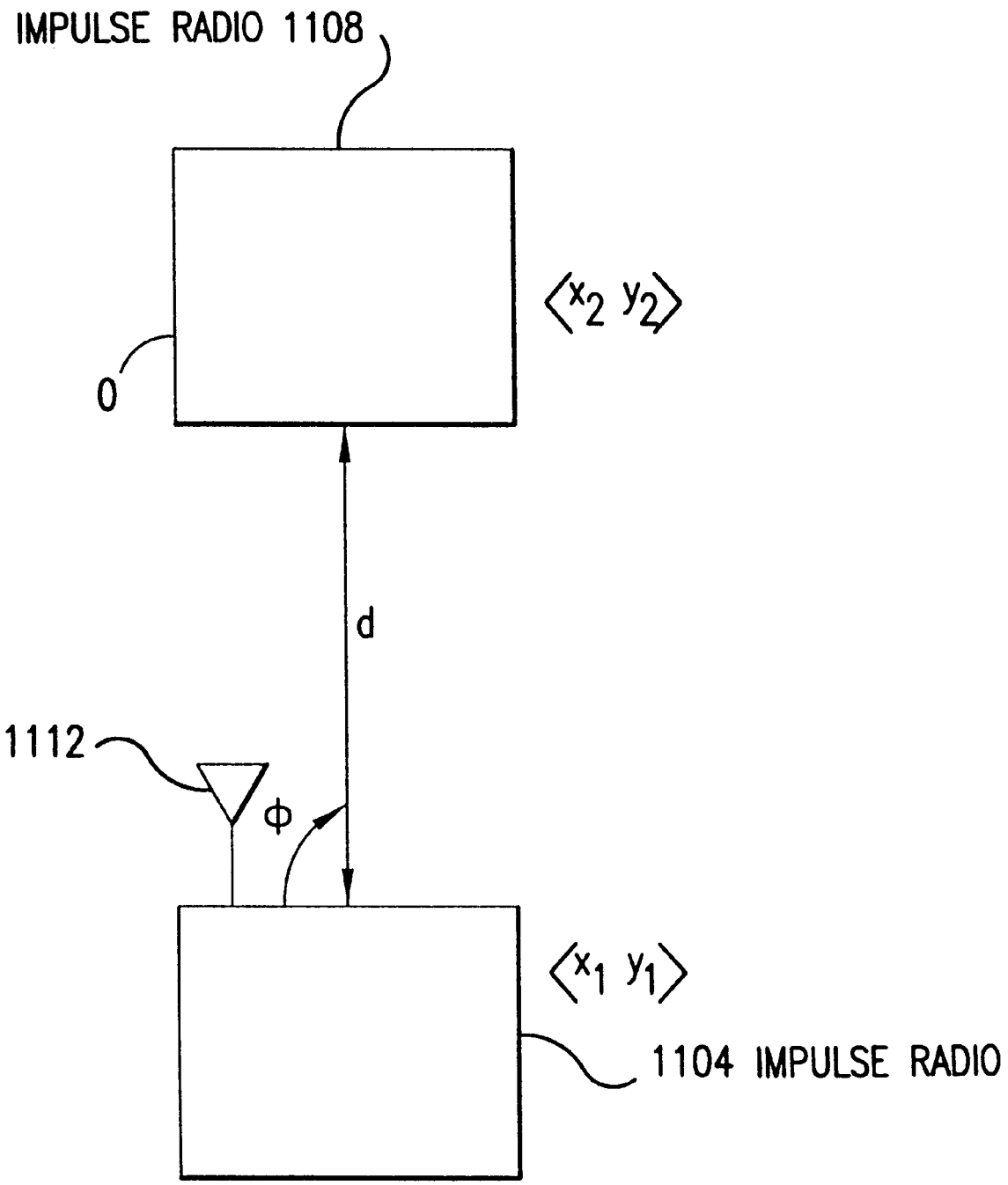
FIG. 11 illustrates one embodiment of the present invention comprising two impulse radios and a direction finding antenna.

FIG. 11 illustrates the present invention in its simplified form, wherein first and second impulse radios 1104 and 1108 and a direction finding antenna 1112 are used to determine the position of an object O.

The impulse radios 1104 and 1108 are each configured to provide the functionalities of both a transmitter and a receiver. The first impulse radio 1104 and the direction finding antenna are at a location (x1, y1). The second impulse radio 1108 is mounted on the object O whose position (x2, y2) is to be determined. The object O is located at a distance d from the first impulse radio 1104. Note that with all of the embodiments of this invention where the receiver or the transmitter is mounted on the object O or a reference point, it is not necessary to mount the antenna 1112 at such point.

Figure 12A:
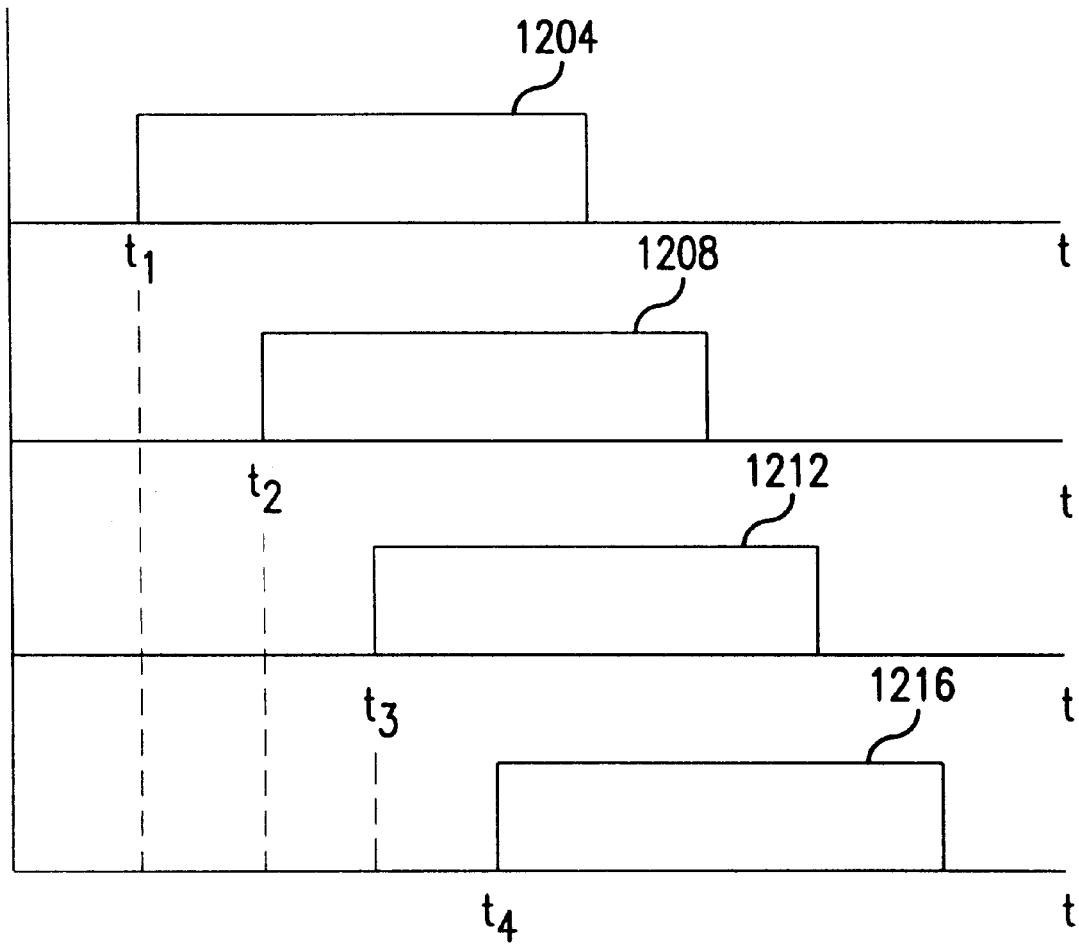
FIGS. 12A and 12B are timing diagrams illustrating the operation of the embodiment of FIG. 11.
Figure 12B:
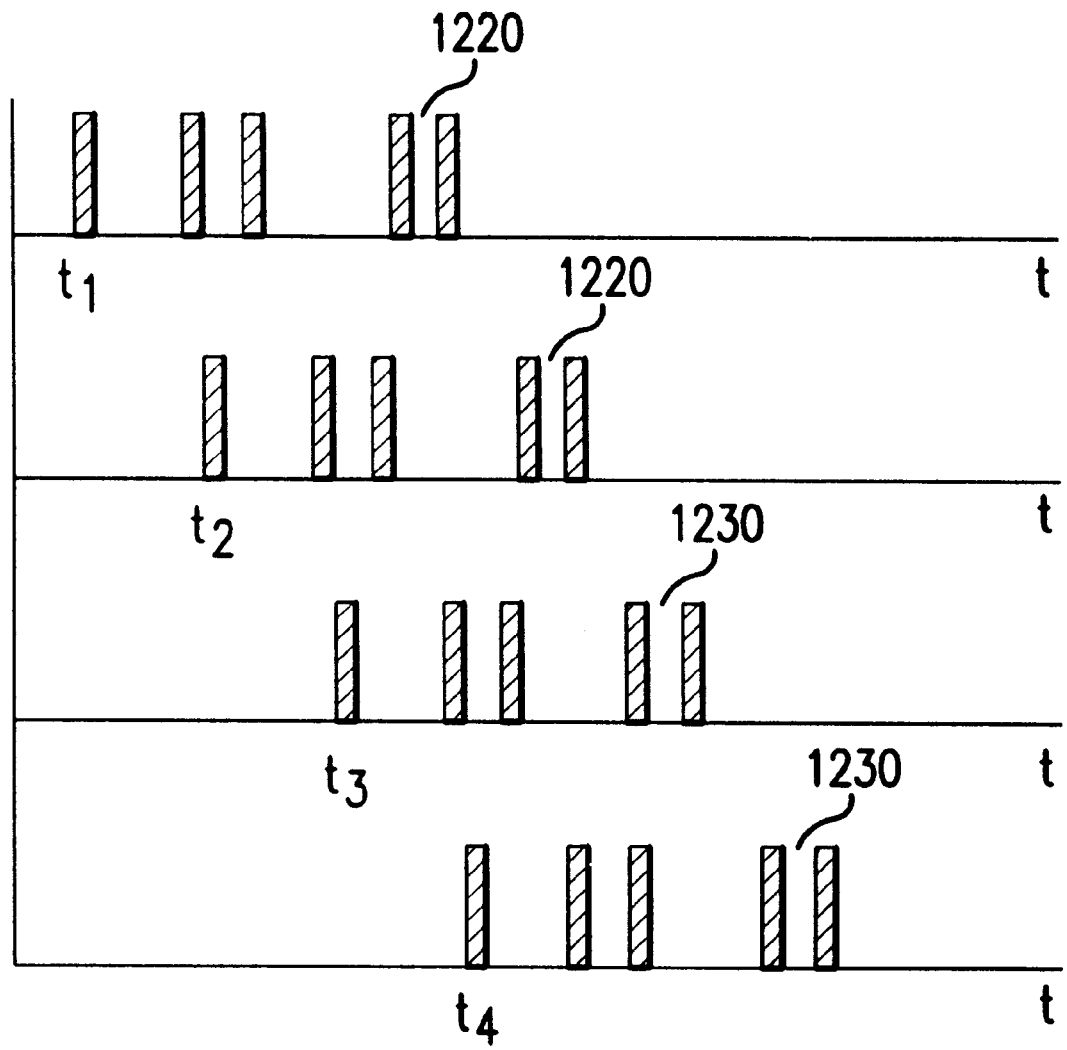

FIGS. 12A and 12B are timing diagrams illustrating the operation of the embodiment of FIG. 11. For the sake of simplicity, the operation of the present invention is illustrated using a reference clock pulse (FIG. 12A) in conjunction with pulse trains (FIG. 12B). In actual operation, a sequence of reference clock pulses are generated by clocks at the impulse radios 1104 and 1108. The reference clock pulses are then processed by the impulse radios and are used to generate to pulse trains shown in FIG. 12B. The shape of the actual transmitted waveform is shown in FIG. 2A.

Referring now to FIG. 12A, a reference clock pulse 1204 is generated by the impulse radio 1104 at time $t_1$. The reference clock pulse 1204 corresponds to the transmission of a pulse train 1220 by the impulse radio 1104. (Also at time $t_1$, a pulse train 1220 is transmitted by the impulse radio 1104.) The pulse train 1220 is received by the impulse radio 1108 at time $t_2$, at which time the impulse radio 1108 synchronizes its own clock with the pulse train 1220. A reference clock pulse 1208 generated by the impulse radio 1108 corresponds to the synchronization of the impulse radio 1108 with the pulse train 1220.

Next, at time $t_3$, the impulse radio 1108 transmits a pulse train 1230. A reference clock pulse 1212 generated by the impulse radio 1108 at time $t_3$ corresponds to the transmission of the pulse train 1230. Thus, $t_3-t_2$ is the elapsed time between when the impulse radio 1108 receives the pulse train 1220 and the time the impulse radio 1108 transmits the pulse train 1230. The pulse train 1230 is received by the impulse radio 1104 at time $t_4$ at which time the impulse radio 1104 synchronizes itself with the pulse train 1230. A reference clock pulse 1216 generated by the impulse radio 1104 at time $t_4$ corresponds to the impulse radio 1104 synchronizing itself with the pulse train 1230.

Next, the time difference between the reference clock pulse 1216 and the reference clock pulse 1204 is determined. The time difference is given by $t_4-t_1$. The time difference represents the elapsed time between the transmission of the pulse train 1220 by the impulse radio 1104 and the reception of the pulse train 1230 by the impulse radio 1104. The time of flight is given by $(t_4-t_1)-(t_3-t2)$, where $(t_3-t_2)$ is the delay encountered at the impulse radio 1108. The time $(t_3-t_2)$ can be resolved by a system calibration step where the transceivers are set up at known distances and an estimated time representing $(t_3-t_2)$ is used to calculate distance. Any error becomes a correction factor to be subtracted from all subsequent distance measurements, or alternatively the estimated time representing $(t_3-t_2)$ can be updated to show the correct distance and the updated time used for subsequent distance calculations.

Next, the distance d is calculated from the time of flight. Then, the angular direction $\phi$ of the impulse radio 1108 is determined by the direction finding antenna 1112. The angular direction $\phi$ of the impulse radio 1108 is the angle of the impulse radio 1108 with respect to the first impulse radio 1104. Finally, the position (x2, y2) of the object O is determined using the distance d and the angular direction $\phi$.

In another embodiment of the present invention, further simplification and cost reduction is achieved by using a passive receiver method. According to the passive receiver method, the impulse radio 1104 is configured solely as a receiver, while the impulse radio 1108 is configured solely as a transmitter. The impulse radios 1104 and 1108 are synchronized by a universal clock, i.e., an external clock or an atomic clock. In other words, internal clocks (or voltage controlled oscillators (VCOs)) of the impulse radios 1104 and 1108 are in sync with an external clock, i.e., a universal clock. This insures that the internal clocks (or VCOs) of the impulse radio run synchronously. The synchronization can be achieved by initializing clocks prior to the impulse radios being deployed into operation. The details of such synchronization would be apparent to a person skilled in the relevant art.

In operation, at time $t_1$, impulse radios 1104 and 1108 each generate a reference clock pulse T1. Also, at time $t_1$, the impulse radio 1108 transmits a sequence of pulses ($S_1$). $S_1$ is received by the impulse radio 1104. The impulse radio 1104 then synchronizes itself with $S_1$ and produces a delayed reference clock pulse T1'. The impulse radio 1104 then determines the time difference (T1'–T1). The impulse radio 1104 then calculates the position (x2, y2) according to the technique described above.

Figure 13:
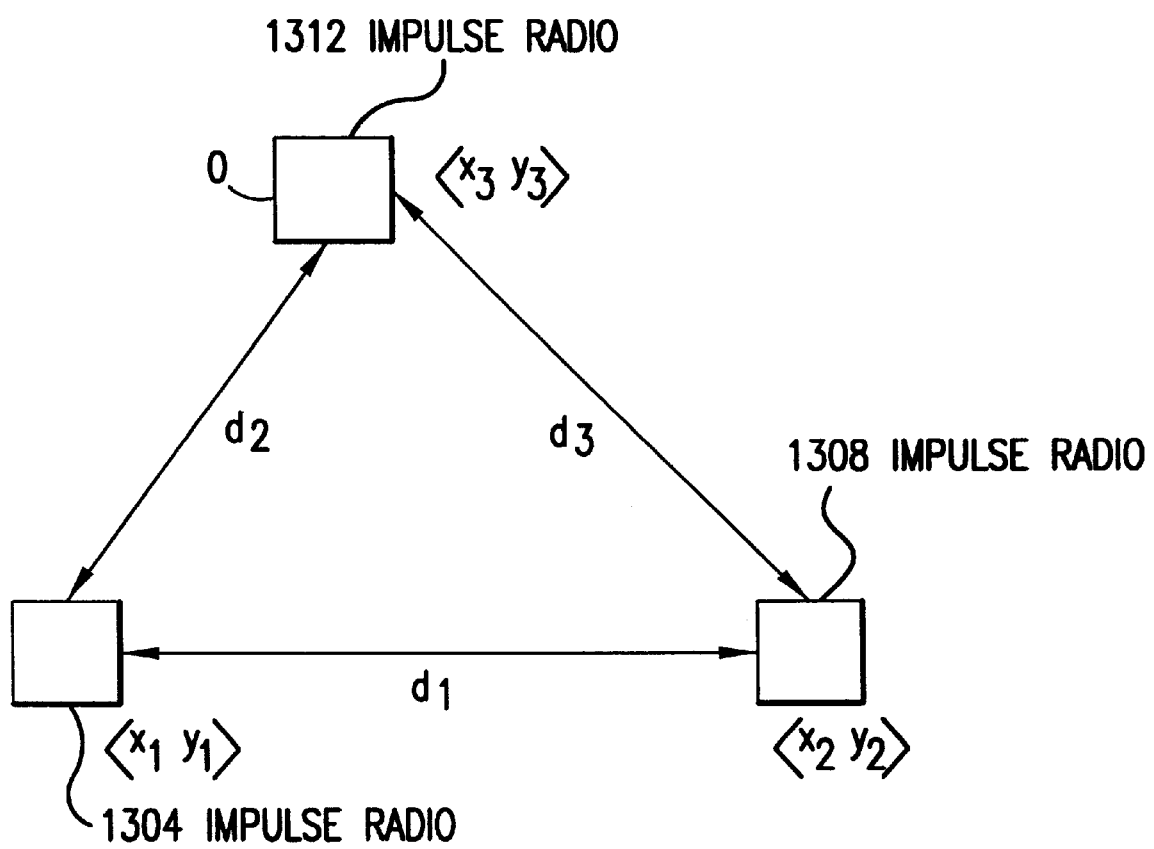
FIG. 13 shows another embodiment of the present invention comprising three impulse radios.

In yet another embodiment of the present invention, a third impulse radio can be substituted in lieu of the direction finding antenna for position determination. FIG. 13 shows an embodiment of the present invention having three impulse radios 1304, 1308 and 1312. The first and the second impulse radio 1304 and 1308 are located at positions (x1, y1) and (x2, y2), respectively, each spaced from the other by a distance $d_1$. The third impulse radio 1312 is mounted on the object O whose position (x3, y3) is to be determined. The object O is located at distances $d_2$ and $d_3$ from the first and the second impulse radio 1304 and 1308, respectively.

Figure 14:
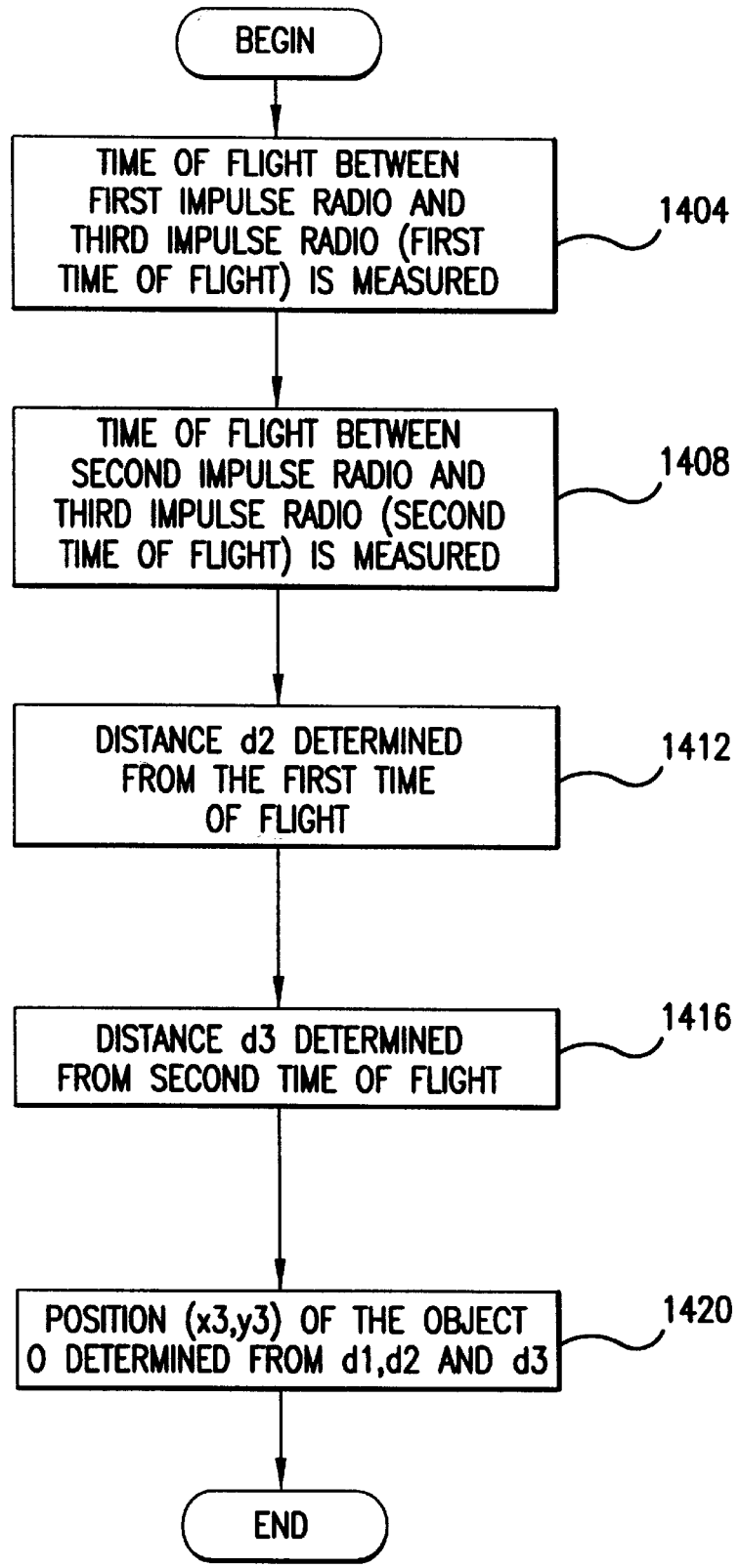
FIG. 14 is an operational flow diagram illustrating the steps involved in FIG. 13.

FIG. 14 is an operational flow diagram illustrating the method of determining the position of the object O in accordance with the embodiment of FIG. 13. In a step 1404, the time of flight (also referred to as the first time of flight) between the first impulse radio 1304 and the third impulse radio 1312 is determined. In a step 1408, the time of flight (also referred to as the second time of flight) between the second impulse radio 1308 and the third impulse radio 1312 is determined. In a step 1412, the distance $d_2$ is determined from the first time of flight. In a step 1416, the distance $d_3$ is determined from the second time of flight. Finally, in a step 1420, the position (x3, y3) of the object O is calculated from $d_2$, $d_3$, (x1, y1) and (x2, y2) using a triangulation method. The distance $d_1$ can be measured and provides a check on the relative coordinates (x1, y1) and (x2, y2). This information and any error can be used to update the measurement system.

Again, further simplification and cost reduction of the embodiment of FIG. 13 can be achieved by using a passive receiver method. According to the passive receiver method, the first and the second impulse radio 1304 and 1308 are each configured solely as a receiver, while the third impulse radio 1312 is configured solely as a transmitter. The first, second and third impulse radios 1304, 1308 and 1312 are synchronized by a universal clock. The synchronization of the clocks can be achieved by initializing the clocks prior to the impulse radios being deployed into operation. Other synchronization techniques can be employed as would be apparent to a person skilled in the relevant art. In operation, the distances $d_2$ and $d_3$ are measured using methods described earlier. Then, the position of the object (x3, y3) is determined from $d_1$, $d_2$ and $d_3$ by a triangulation method.

Figure 15:
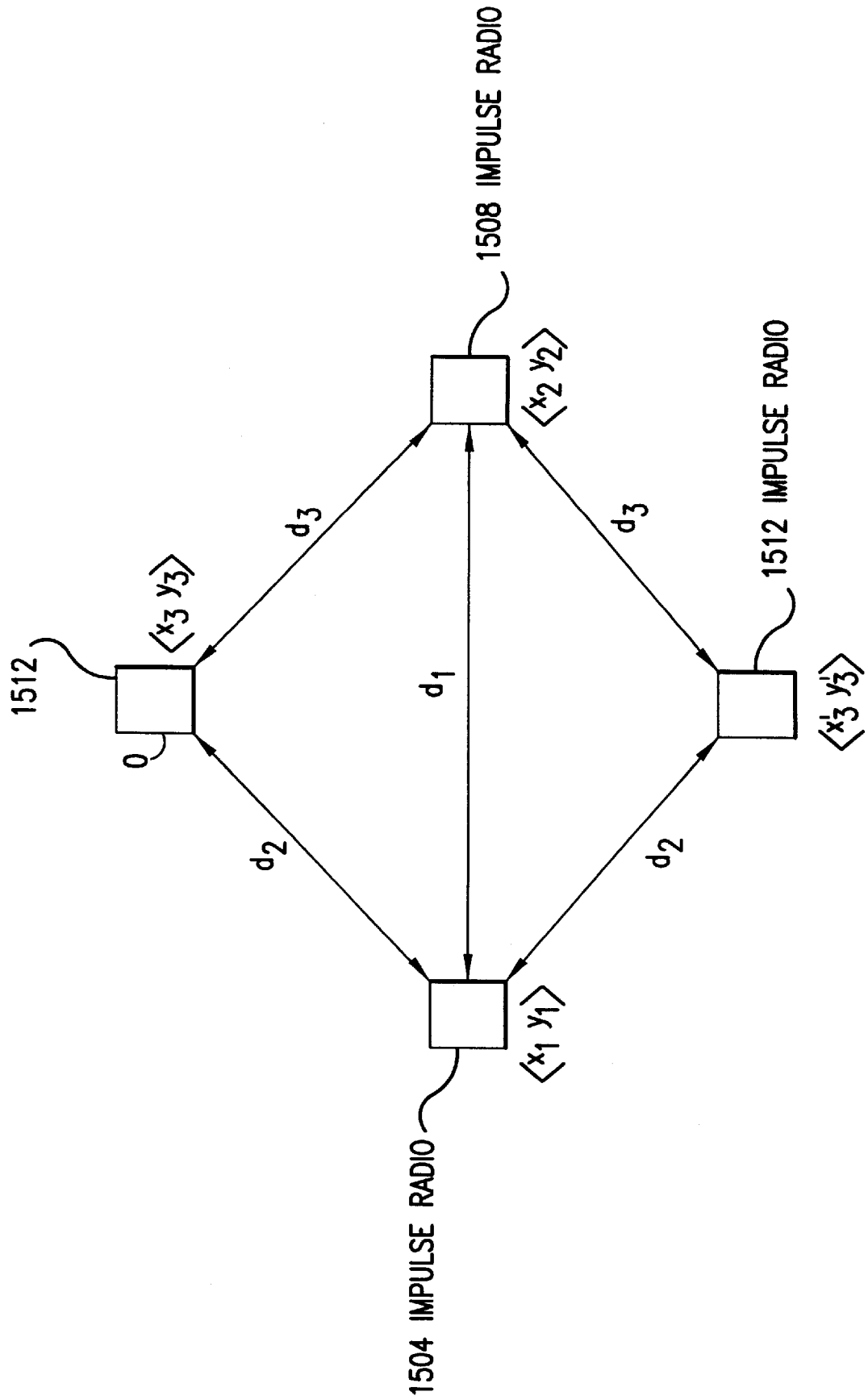
FIG. 15 illustrates a phenomenon known as position ambiguity.

The use of only three impulse radios results in a phenomenon known as position ambiguity, which is illustrated in FIG. 15. Briefly stated, position ambiguity refers to the condition wherein a triangulation method provides two solutions for the position of the object. One solution is the actual position (x3, y3) of the object, while the other solution (x3', y3') is a mirror image of the actual position. Referring now to FIG. 15, a triangulation method provides a solution that indicates that the object may be located at either (x3, y3) or at (x3', y3'). This ambiguity is resolved by the use of a direction finding antenna placed at or near the first or the second impulse radio 1504 or 1508. The direction finding antenna can be utilized to accurately ascertain the true position of the object by determining the angular direction φ of the object O. An alternative method is to position two or more directional antennas such that their respective coverage areas each favor different position ambiguity areas. These antennas may be alternately selected and the relative signal strength used to determine which antenna is receiving the stronger signal. This would thus resolve the position ambiguity. The directional antennas may be electrically or mechanically steered array antennas. The details of ascertaining the true position of the object by a directional antenna are beyond the scope of the present invention and would be apparent to a person skilled in the relevant art.

Figure 16:
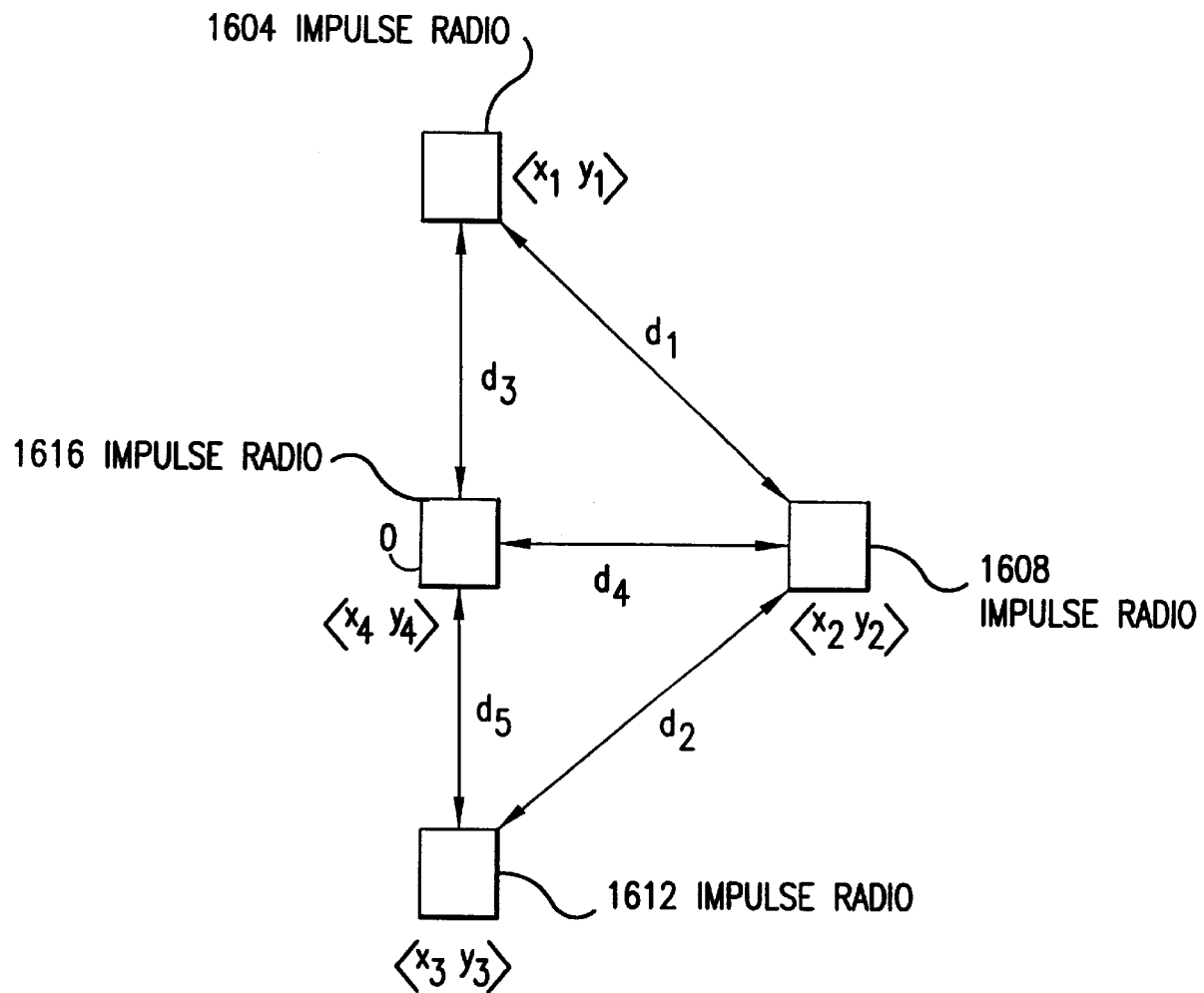
FIG. 16 illustrates yet another embodiment of the present invention that resolves the position ambiguity of FIG. 15.

In the alternative, a fourth impulse radio can be used to resolve the position ambiguity, and this is shown in FIG. 16. Referring now to FIG. 16, first, second and third impulse radios 1604, 1608 and 1612 are placed at locations (x1, y1), (x2, y2) and (x3, y3), respectively. A fourth impulse radio 1616 is mounted on the object whose position (x4, y4) is to be determined. The object O is at a distance $d_3$, $d_4$ and $d_5$ from the first, second and third impulse radios 1604, 1608, 1612, respectively. The distance $d_1$ between the first and second impulse radios and the distance $d_2$ between the second and the third impulse radios are known. Using methods described previously, the distances $d_3$, $d_4$ and $d_5$ are determined. Then, the position (x4, y4) of the object O is calculated by any known triangulation methods.

Another phenomenon known as elevation ambiguity may exist if the impulse radios of FIG. 16 are not coplanar. The elevation ambiguity can be resolved by using a fifth impulse radio.

Recently, the mobile telephone industry has received a mandate from the Federal Communication Commission (FCC) to install position determination systems in mobile telephones. According to the FCC mandate, a mobile telephone network must be able to locate a caller of an emergency 911 call within 30 meters of accuracy. Although various technologies to implement this feature are currently being considered, no single technology has emerged as feasible.

The position determination system according to the present invention can be conveniently used to meet the FCC mandate. According to one embodiment of the present invention, an impulse radio can be used to locate the position of a mobile telephone user.

According to yet another embodiment of the present invention, a mobile telephone is equipped with an impulse radio receiver. The impulse radio receiver locks onto three beacons (or train of pulses), wherein each beacon is being transmitted by a base station. Thus, the mobile telephone simultaneously communicates with three base stations (three or more transmitted beacons are required to resolve the position ambiguity of the mobile phone). This can be performed by equipping the mobile phone with three separate cross correlators or a fast cross correlator. Other methods that are well known to a person skilled in the art can be employed to lock onto three separate beacons. Then, the time of flight of each beacon is computed by the mobile telephone. Then, using the methods described above, the position of the mobile phone is computed. Finally, the mobile telephone transmits the information to the base stations.

Several other variations of the above embodiment can be implemented. For example, a mobile telephone can be equipped with an impulse radio transmitter. The transmitter can transmit three beacons to three base stations (i.e. each base station receives a beacon). Each base station computes the distance between the mobile telephone and the base station from the time of flight of the respective beacon. The base stations then transmit the information regarding the measured distances to one of the base stations selected from the three base stations. The selected base station then computes the position of the mobile telephone using the measured distances.

In yet another embodiment of the present invention, digital data, digitized voice, and/or analog modulation may be transmitted on the data channel while positioning is independently derived from timing information. The transmitter and the receiver used in this embodiment is described in detail in U.S. Pat. No. 5,677,927 noted above.

The present invention can also be used in a GPS system to provide for greater accuracy. In fact, using the present invention, the GPS system could be updated, or another system could be deployed to deliver greater accuracy.

The principle limitation of the GPS system is that there is no convenient way to match carrier cycles with modulation cycles, making it very difficult to combine the coarse resolution available from modulation with the fine resolution available from carrier phase. Thus, designers are left with a choice between absolute range and resolution based on modulated information that is accurate within 5 meters using full military capability, and relative range based on carrier phase that is accurate within a few centimeters, but the system must start at a known point.

With a GPS system employing impulse radio transmitters and receivers, it is possible to determine the time domain equivalent of carrier phase to absolute accuracy, to thereby resolve subcycle time differences that permit range accuracy and resolution within a few centimeters. This leaves propagation effects as the largest remaining error source, since time errors and other implementation effects can generally be reduced to acceptable levels.

The claimed invention provides several solutions to problems faced by designers of position determination systems. In the past, it was not obvious to the designers how to use pulses in a practical position determination system. The problem is that it is difficult to generate a single pulse of adequate power to propagate over a useful range. The detection of a single pulse is also difficult and requires large a signal to noise ratio. The claimed invention avoids this problem by using pulse trains. With pulse trains, it is possible to add the energy from many pulses to achieve the equivalent effect of one single pulse. In the claimed invention, time position coding of pulse trains is used so that the repeat length of a coded pulse train is longer than the distance to be measured, thus resolving a potential range ambiguity resulting from a rapid pulse rate.

In the claimed invention, the time difference between the transmitted and received pulse trains is measured indirectly by measuring the phase difference between the associated corresponding time bases that are used to generate the pulse trains. The effect of an entire pulse train is averaged in the above described loop lock filter so that pulse timing errors are reduced, while signal to noise ratio is improved by integration gain. The integration method in the cross correlator is fully described in the above noted patents. This requires extremely stable and accurate time bases. In one embodiment of the claimed invention, the time bases are generated from high frequency clocks typically phase locked to a crystal reference. The high frequency clocks are counted down using a binary counter with a modulo count equal to the modulo repeat length of the pulse position code, which is used to prevent range ambiguities from the repetitive pulse trains.

When the impulse radio position determination system is operated in an area of high multipath and/or the line of sight between the transmitter and receiver is blocked, the largest signal that the receiver may receive may not represent the shortest distance between the receiver and the transmitter. This will result in an error in the estimate of distance between the transmitter and the receiver. Specifically, the distance will be over estimated. One way to resolve this would be to allow the receiver to lock onto the largest available signal, whether a reflection or not, and then search for earlier signals with longer dwell times and narrower information bandwidths in order to find the earliest signal. In the case of urban positioning, the earliest signal may not be discernable. However, if there are a plurality of either beacons or remote receivers scattered over the area of interest, the uncertainty may be reduced by statistical methods such as finding the centroid of the area bounded by the range estimates, or the least squares of the data method or other techniques that are known to those skilled in the art.

Conclusion

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. In an impulse radio system having a first transceiver with a first clock and a second transceiver spaced from said first transceiver and having a second clock, a method comprising the steps of:

generating a first reference clock pulse using said first clock;

triggering the transmission of a first sequence of pulses with said first reference clock pulse:

transmitting from said first transceiver said first sequence of pulses;

receiving said first sequence of pulses at said second transceiver;

synchronizing said second transceiver using said first sequence of pulses;

generating a second reference clock pulse using said second clock;

triggering the transmission of a second sequence of pulses with said second reference clock pulse;

transmitting from said second transceiver said second sequence of pulses;

receiving at said first transceiver said second sequence of pulses;

synchronizing said first transceiver with said second sequence of pulses;

generating a delayed first reference clock pulse in response to said synchronization with said second sequence of pulses; and measuring a time difference between said delayed first reference clock pulse and said first reference clock pulse, said time difference indicating a total time of flight of said first and second sequence of pulses.

2. The method as recited in claim 1, further comprising the step of determining, from said time difference, the distance between said first and second transceivers.

3. The method as recited in claim 2, further comprising the steps of:

determining an angular direction of said second transceiver from said first transceiver using a direction finding antenna; and determining the position of said second transceiver from said distance and said angular direction.

4. The method as recited in claim 1, wherein a plurality of first transceivers are positioned spaced apart from each others and apart from said second transceiver.

5. The method as recited in claim 4, further comprising the step of determining the distance between each of said first transceivers and said second transceiver.

6. The method as recited in claim 5, further comprising the step of determining the position of the second transceiver using triangulation.

7. The method as recited in claim 1, wherein said synchronization comprises the step of performing coherent detection using a cross correlator.

8. The method as recited in claim 1, further comprising the step of installing said second transceiver in a mobile telephone whose position is to be determined.

9. The method as recited in claim 3, further comprising the step of transmitting from said first transceiver information representative of the position of said second transceiver.

10. The method as recited in claim 3, further comprising the step of receiving at said second transceiver information representative of the position of said second transceiver.

11. In an impulse radio system having a receiver with a first clock and a transmitter spaced from said receiver and having a second clock, wherein said first clock and said second clock are initially synchronized, a method comprising the steps of:

generating a first reference clock pulse using said first clock;

triggering the transmission of a sequence of pulses with said first reference clock pulse;

transmitting from said transmitter said sequence of pulses;

receiving said sequence of pulses at said receiver;

further synchronizing said receiver with said sequence of pulses;

generating a delayed first reference clock pulse at said receiver in response to said further synchronization with said sequence of pulses; and measuring a time difference between said delayed first reference clock pulse and said first reference clock pulse, said time difference indicating a time of flight of said sequence of pulses from said transmitter to said receiver.

12. The method as recited in claim 11, further comprising the step of determining from said time difference the distance between said transmitter and said receiver.

13. The method as recited in claim 12, further comprising the steps of:

determining an angular direction of said transmitter from said receiver using a direction finding antenna; and determining the position of said transmitter from said distance and said angular direction.

14. The method as recited in claim 11, wherein a plurality of receivers are placed spaced apart from each others and apart from said transmitter.

15. The method as recited in claim 14, further comprising the step of determining the distance between each of said receivers and said transmitter.

16. The method as recited in claim 15, further comprising the step of determining the position of said transmitter using triangulation from said distances.

17. The method as recited in claim 11, further comprising the step of synchronizing said first and second clocks.

18. The method as recited in claim 11, further comprising the step of synchronizing said first and second clocks with an atomic clock.

19. The method as recited in claim 11, further comprising the step of placing said transmitter at a predetermined location.

20. The method as recited in claim 11, further comprising the step of placing said transmitter in a mobile telephone whose position is to be determined.

21. An impulse radio system, comprising:

an impulse radio receiver with a first time base providing a first timing signal;

an impulse radio transmitter spaced from said receiver and having a second time base initially synchronized with said first time base, wherein information related to the position of said impulse radio transmitter is determined by transmitting from said transmitter a sequence of pulses, transmission of said sequence of pulses being triggered by said first timing signal, receiving said sequence of pulses at said receiver, further synchronizing said receiver with said transmitter using said sequence of pulses, generating a delayed first timing signal at said receiver in response to said further synchronization with said sequence of pulses, and measuring a time difference between said delayed first timing signal and said first timing signal, said time difference indicating a time of flight of said sequence of pulses.

22. The system of claim 21, wherein the distance between said transmitter and said receiver is determined from said time difference.

23. The system of claim 22, further comprising a direction finding antenna for determining an angular direction of said transmitter from said receiver, wherein the position of said transmitter is determined from said distance and said angular direction.

24. The system of claim 21, wherein a plurality of receivers are placed spaced apart from each other and apart from said transmitter.

25. The system of claim 24, wherein the distance between each of said receivers and said transmitter is determined.

* * * * *